Oct. 31, 1933.  F. RÜSBERG  1,933,452
MANUFACTURE OF POTASSIUM CARBONATE
Filed Aug. 10, 1932
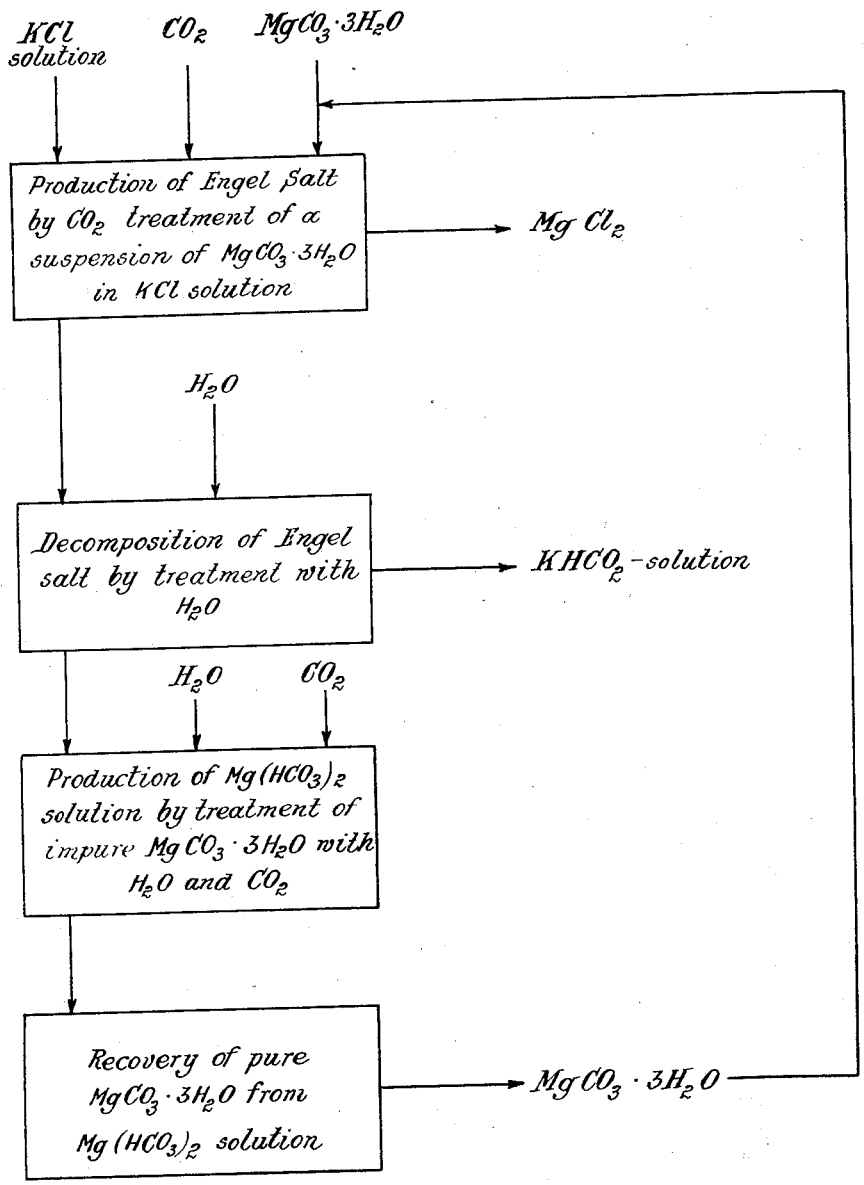
Inventor:
Friedrich Rüsberg
By Marks & Clark
Attys.

Patented Oct. 31, 1933

1,933,452

UNITED STATES PATENT OFFICE 1,933,452

MANUFACTURE OF POTASSIUM CARBONATE

Friedrich Rüsberg, Berlin - Niederschoneweide, Germany, assignor to Kali-Chemie, Aktiengesellschaft, Berlin, Germany Application August 10, 1932, Serial No. 628,258, and in Germany September 29, 1931

12 Claims. (Cl. 23—63)

This invention relates to the manufacture of potassium carbonate from potassium salts of strong mineral acids and magnesium carbonate trihydrate.

It is known to make potassium carbonate by treating with carbon dioxide a suspension of magnesium carbonate trihydrate in an aqueous solution of potassium chloride, whereby a crystal water containing double salt of potassium bicarbonate and magnesium carbonate, named Engel salt, precipitates, which on decomposition with water at raised temperature furnishes an aqueous solution of potassium bicarbonate, which may contain potassium carbonate and solid magnesium bicarbonate trihydrate, which is used again for the manufacture of potassium carbonate from fresh potassium chloride. This process, in which the potassium chloride may be replaced by potassium salts of other strong mineral acids, such as potassium sulfate, is called Engel-Precht method and supposed to take place according to the following equations:

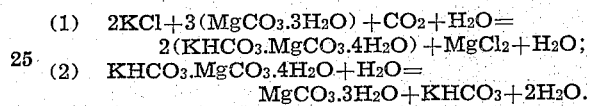

(1) $2KCl + 3(MgCO_3.3H_2O) + CO_2 + H_2O =$
$2(KHCO_3.MgCO_3.4H_2O) + MgCl_2 + H_2O;$
(2) $KHCO_3.MgCO_3.4H_2O + H_2O =$
$MgCO_3.3H_2O + KHCO_3 + 2H_2O.$

The magnesium carbonate trihydrate obtained by the decomposition of the Engel salt always contains some basic magnesia, which is not able to form Engel salt with fresh potassium chloride, when reusing the magnesium carbonate trihydrate obtained by the decomposition of Engel salt for the process again. After several cycles of this recovered magnesium carbonate trihydrate its content of basic magnesia and other solid impurities becomes so high, that serious difficulties in the formation of fresh Engel salt originate. It is then usual to remove the cycling magnesium carbonate trihydrate from the process or to regenerate it. This regeneration is carried out by calcining the impure trihydrate at temperatures far above 1000° C., thus obtaining calcined magnesia, which is hydrated and then converted into magnesium carbonate trihydrate by treatment with carbon dioxide in presence of water. This regeneration treatment affords special furnaces and other devices and is very expensive.

The main object of the present invention is to replace the above described expensive regeneration treatment of the cycling magnesium carbonate trihydrate by a simple and effective, cheaper process, which does not afford the employment of high temperatures and calcining furnaces and other special devices.

A further object of the invention is to provide for a continuous regeneration treatment of the cycling magnesium carbonate trihydrate.

Still a further object of the invention is to maintain the cycling magnesium carbonate trihydrate by partial regeneration as long as possible in such a state of purity, that the production of Engel salt is not disturbed by the use of the cycling trihydrate.

According to the invention the regeneration of the impure magnesium carbonate trihydrate obtained by the decomposition of Engel salt is carried out by converting it into the water soluble magnesium bicarbonate by treatment with carbon dioxide in presence of water and recovering magnesium carbonate trihydrate from the bicarbonate solution obtained, by heating the solution or by neutralizing the bicarbonate with caustic magnesia, thus precipitating magnesium carbonate trihydrate. By the treatment of the impure trihydrate with carbon dioxide in presence of water also the basic magnesia present as impurity in the trihydrate is converted into water soluble magnesium bicarbonate, whereas the other solid impurities may be removed by separating them from the magnesium bicarbonate solution obtained as intermediate product in the regeneration treatment. The regeneration of the impure magnesium carbonate trihydrate obtained by decomposition of Engel salt may be carried out periodically after this trihydrate has been used several times in the cyclic process, or continuously, by regenerating always a part of the trihydrate obtained by each decomposition treatment of freshly produced Engel salt and using the regenerated magnesium carbonate trihydrate together with the not regenerated part of trihydrate in a cycle. This continuous partial regeneration is the preferred form of the invention, as it enables to maintain the trihydrate of magnesium carbonate obtained by the decomposition of Engel salt for a long time in such a state of purity, that it does not disturb the formation of fresh Engel salt, when reusing it in the process.

Examples

1. Engel salt, containing about 13% MgO and 20% $K_2CO_3$ and obtained in the usual manner by treating with carbon dioxide a suspension of magnesium carbonate trihydrate in an aqueous solution of potassium chloride, is decomposed by treatment with water at about 40 to 95° C. The solution of potassium bicarbonate obtained, which solution may contain potassium carbonate, is separated from the solid magnesium carbonate trihydrate and worked up in the usual manner to obtain potassium carbonate, for example by evaporation. The magnesium carbonate trihydrate obtained by the decomposition is used again in the manufacture of fresh Engel salt together with such amounts of fresh trihydrate as are necessary to compensate the trihydrate spent for the conversion of potassium chloride into potassium bicarbonate under formation of magnesium chloride, which is removed from the process. After the trihydrate of magnesium carbonate obtained by decomposition of Engel salt has been used in the cycle for about twenty times, it has to be regenerated, to remove the impurities and to convert the basic magnesia present in the trihydrate into trihydrate.

630 kg. of impure magnesium carbonate trihydrate, obtained by decomposition of Engel salt are suspended in about 6 cbm. water. Carbon dioxide is introduced for about two hours into this suspension at a pressure of 3 atmospheres. The liquid, containing about 12.5 kg. of MgO per cbm., the MgO being present as magnesium bicarbonate, obtained is filtered from the residue, which amounts to about 150 kg. The residue is suspended in about 4 cbm. of water and the suspension treated with carbon dioxide at a pressure of about 3 atmospheres, until a residue of about 8 kg. is obtained, which is separated from the liquid, containing about 4.6 kg. of MgO per cbm., the MgO being present as magnesium bicarbonate. The solutions of magnesium bicarbonate obtained by the two step treatment are heated to about 50 to 60° C. or neutralized with caustic magnesia, in order to precipitate purified magnesium carbonate trihydrate, which is used again for the manufacture of fresh Engel salt.

The diluted solution of magnesium bicarbonate obtained in the second step of the regeneration treatment may also be used as suspending liquid for new amounts of decomposition trihydrate to be regenerated, instead of recovering purified trihydrate from this solution as described above. When proceeding in this way more concentrated solutions of magnesium bicarbonate are obtained in the regeneration treatment.

(2) Instead of regenerating the entire amount of magnesium carbonate trihydrate, obtained by decomposition of Engel salt after the twentieth decomposition step, as disclosed in Example 1, 15% of the trihydrate formed by each decomposition of Engel salt are always removed from the cycle and regenerated separately in the same manner as described in Example 1. The regenerated trihydrate is always returned into the process together with that part of decomposition trihydrate, which was not subjected to the regeneration treatment. When working in this manner a regeneration of the entire decomposition trihydrate or its removal from the process is not necessary after the twentieth decomposition step as in Example 1; the cyclic process may be carried out up to 60 and even more decomposition steps, before regenerating the entire decomposition trihydrate or removing it from the cycle.

In the examples the potassium chloride may be replaced by other potassium salts of strong mineral acids such as potassium sulfate. It is further preferred although not necessary to use superatmospheric pressure in the regeneration treatment.

The foregoing detailed examples have been given for clearness of understanding only, and no unnecessary limitations should be understood therefrom, but the appended claims should be construed as broadly as permissible in view of the prior art.

I claim:

1. A method for making potassium salts of carbonic acid which consists in treating with carbon dioxide a suspension of magnesium carbonate trihydrate in an aqueous solution of potassium salts of strong mineral acids, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting at least a part of the magnesium carbonate trihydrate, obtained by the decomposition, into magnesium bicarbonate by treatment with carbon dioxide in presence of water, converting the magnesium bicarbonate obtained into magnesium carbonate trihydrate and returning the magnesium carbonate trihydrate into the process for making potassium salts of carbonic acid from fresh potassium salts of strong mineral acids.

2. A method for making potassium salts of carbonic acid which consists in treating with carbon dioxide a suspension of magnesium carbonate trihydrate in an aqueous solution of potassium salts of strong mineral acids, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting the magnesium carbonate trihydrate, obtained by the decomposition, into magnesium bicarbonate by treatment with carbon dioxide in presence of water, converting the magnesium bicarbonate obtained into magnesium carbonate trihydrate and returning the magnesium carbonate trihydrate into the process for making potassium salts of carbonic acid from fresh potassium salts of strong mineral acids.

3. A method for making potassium salts of carbonic acid which consists in treating with carbon dioxide a suspension of magnesium carbonate trihydrate in an aqueous solution of potassium salts of strong mineral acids, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting a part of the magnesium carbonate trihydrate, obtained by the decomposition into magnesium bicarbonate by treatment with carbon dioxide in presence of water, converting the magnesium bicarbonate obtained into magnesium carbonate trihydrate and returning the magnesium carbonate trihydrate obtained from the magnesium bicarbonate together with the remaining part of magnesium carbonate from the decomposition of the double salt.

4. A method for making potassium salts of carbonic acid which consists in treating with carbon dioxide a suspension of magnesium carbonate trihydrate in an aqueous solution of potassium chloride, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting at least a part of the magnesium carbonate trihydrate, obtained by the decomposition, into magnesium bicarbonate by treatment with carbon dioxide in presence of water, converting the magnesium bicarbonate obtained into magnesium carbonate trihydrate and returning the magnesium carbonate trihydrate into the process for making potassium salts of carbonic acid from fresh potassium salts of strong mineral acids.

5. A method for making potassium salts of carbonic acid which consists in treating with carbon dioxide a suspension of magnesium carbonate trihydrate in an aqueous solution of potassium chloride, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting the magnesium carbonate trihydrate, obtained by the decomposition, into magnesium bicarbonate by treatment with carbon dioxide in presence of water, converting the magnesium bicarbonate obtained into magnesium carbonate trihydrate and returning the magnesium carbonate trihydrate into the process for making potassium salts of carbonic acid from fresh potassium salts of strong mineral acids.

6. A method for making potassium salts of carbonic acid which consists in treating with carbon dioxide a suspension of magnesium carbonate trihydrate in an aqueous solution of potassium chloride, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting a part of the magnesium carbonate trihydrate, obtained by the decomposition into magnesium bicarbonate by treatment with carbon dioxide in presence of water, converting the magnesium bicarbonate obtained into magnesium carbonate trihydrate and returning the magnesium carbonate trihydrate obtained from the magnesium bicarbonate together with the remaining part of magnesium carbonate from the decomposition of the double salt.

7. A method for making potassium salts of carbonic acid which consists in treating with carbon dioxide a suspension of magnesium carbonate trihydrate in an aqueous solution of potassium salts of strong mineral acids, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting at least a part of the magnesium carbonate trihydrate, obtained by the decomposition, into magnesium bicarbonate by treatment with carbon dioxide in presence of water, converting the aqueous solution of magnesium bicarbonate obtained into precipitated magnesium carbonate trihydrate by heating and returning the magnesium carbonate trihydrate into the process for making potassium salts of carbonic acid from fresh potassium salts of strong mineral acids.

8. A method for making potassium salts of carbonic acid which consists in treating with carbon dioxide a suspension of magnesium carbonate trihydrate in an aqueous solution of potassium salts of strong mineral acids, separating the solid double salt formed from the liquid obtained, decomposing the separated double salt by treatment with water at raised temperatures, separating the liquid decomposition product, being an aqueous solution of potassium salts of carbonic acid, from the solid decomposition product, being impure magnesium carbonate trihydrate, converting at least a part of the magnesium carbonate trihydrate, obtained by the decomposition, into magnesium bicarbonate by treatment with carbon dioxide in presence of water, converting the aqueous solution of magnesium bicarbonate obtained into precipitating magnesium carbonate trihydrate by neutralizing it with caustic magnesia and returning the magnesium carbonate trihydrate into the process for making potassium salts of carbonic acid from fresh potassium salts of strong mineral acids.

9. In the cyclic manufacture of potassium carbonate from potassium salts of strong mineral acids according to the method of Engel-Precht the steps of regenerating the impure magnesium carbonate trihydrate, obtained by decomposition of Engel salt, by converting it into an aqueous solution of magnesium bicarbonate, separating the solid residue from the solution, recovering magnesium carbonate trihydrate from the solution and reusing this trihydrate for making fresh Engel salt.

10. In the cyclic manufacture of potassium carbonate from potassium salts of strong mineral acids according to the method of Engel-Precht the steps of regenerating a part of the impure magnesium carbonate trihydrate, obtained by each decomposition of Engel salt, by converting it into an aqueous solution of magnesium bicarbonate, separating the solid residue from the solution, recovering magnesium carbonate trihydrate from the solution and reusing this trihydrate together with the not regenerated part of decomposition trihydrate for making fresh Engel salt.

11. A method for regenerating impure magnesium carbonate trihydrate obtained by decomposition of Engel salt with water which consists in treating said magnesium carbonate trihydrate with carbon dioxide in presence of water at superatmospheric pressure, separating the aqueous solution of magnesium bicarbonate obtained from the residue and converting the bicarbonate of magnesium into magnesium carbonate trihydrate.

12. A continuous method for making potassium carbonate from potassium chloride and magnesium carbonate trihydrate according to Engel-Precht which consists in treating with carbon dioxide a suspension of magnesium carbonate trihydrate in an aqueous solution of potassium chloride, separating the solid product formed from the solution of magnesium chloride obtained, treating the separated solid product with water at temperatures between 40 and 95° C., separating the solution obtained from the solid decomposition product, being impure magnesium carbonate trihydrate, evaporating said separated solution, which contains potassium salts of carbonic acid, to recover potassium carbonate, treating a part of the solid decomposition residue suspended in a diluted aqueous solution of magnesium bicarbonate with carbon dioxide at a superatmospheric pressure, separating the aqueous solution of magnesium bicarbonate obtained from solid residue, heating said solution to precipitate purified magnesium carbonate trihydrate and reusing the purified magnesium carbonate trihydrate together with the remaining part of impure magnesium carbonate trihydrate, obtained by decomposition, and together with fresh magnesium carbonate trihydrate, to replace the magnesium removed from the process as chloride, for the process.

FRIEDRICH RÜSBERG.